(12) United States Patent
Iwai (10) Patent No.: US 10,397,454 B2
(45) Date of Patent: Aug. 27, 2019

(54) MULTIPOLARIZED SIGNAL TERMINAL CONNECTOR FOR ACCESSORY, ACCESSORY SHOE DEVICE, IMAGE PICKUP APPARATUS, AND ACCESSORY

(71) Applicant: CANON KABUSHIKI KAISHA, Tokyo (JP)

(72) Inventor: Keita Iwai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 15/422,974

(22) Filed: Feb. 2, 2017

(65) Prior Publication Data
US 2017/0223276 A1    Aug. 3, 2017

(30) Foreign Application Priority Data

Feb. 3, 2016    (JP) ................................. 2016-018797
Feb. 3, 2016    (JP) ................................. 2016-018798

(51) Int. Cl.
*H04N 5/225*    (2006.01)
*G03B 17/56*    (2006.01)
(Continued)

(52) U.S. Cl.
CPC ....... *H04N 5/2254* (2013.01); *G03B 15/0421* (2013.01); *G03B 17/566* (2013.01); *H01R 12/775* (2013.01); *H01R 12/777* (2013.01); *H01R 13/2442* (2013.01); *H01R 13/629* (2013.01); *H01R 13/639* (2013.01); *H01R 13/652* (2013.01); *H04N 5/2256* (2013.01); *H04N 5/23293* (2013.01)

(58) Field of Classification Search
CPC ............... H04N 5/2254; H04N 5/2256; G03B 15/0421; G03B 17/566; G03B 15/041; G03B 15/0426; H01R 12/777; H01R 13/639; H01R 13/652; H01R 13/629; H01R 12/775
USPC .................................................. 396/374–375
See application file for complete search history.

(56) References Cited

U.S. PATENT DOCUMENTS 5,065,175 A * 11/1991 Suzuki ..................... G02B 7/36
                                                                  359/827
6,336,754 B1 * 1/2002 Sato ........................ G03B 7/20
                                                                  396/529
(Continued)

FOREIGN PATENT DOCUMENTS

JP         4042717 B    2/2008

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

A multipolarized signal terminal connector for an accessory, which is applied to an accessory shoe device having a defined shape. The signal terminal connector includes a first surface opposed to an attaching direction of an accessory, a first terminal row provided the first surface, a second surface which is inclined with respect to the first surface by a predetermined angle, and a second terminal row provided in the second surface. The second surface is inclined with respect to the first surface, in a predetermined direction orthogonal to the attaching direction of the accessory and a direction in which the terminals of the second terminal row are arranged, and is displaced with respect to the first surface in the predetermined direction.

20 Claims, 9 Drawing Sheets (51) Int. Cl.
*H01R 13/652* (2006.01)
*H01R 12/77* (2011.01)
*H01R 13/629* (2006.01)
*H01R 13/24* (2006.01)
*H01R 13/639* (2006.01)
*G03B 15/04* (2006.01)
*H04N 5/232* (2006.01)
*H04N 5/32* (2006.01)

(56) References Cited

U.S. PATENT DOCUMENTS

| | | | | |
|---|---|---|---|---|
| 8,098,326 B2 * | 1/2012 | Takashima | ............ | G03B 15/05 |
| | | | | 348/375 |
| 2009/0169199 A1 * | 7/2009 | Takano | ................ | G03B 11/00 |
| | | | | 396/544 |
| 2012/0315029 A1 * | 12/2012 | Ryu | ..................... | G03B 15/05 |
| | | | | 396/542 |
| 2014/0009671 A1 * | 1/2014 | Ozone | ................ | H04N 5/2251 |
| | | | | 348/371 |
| 2016/0124291 A1 * | 5/2016 | Qingyuan | ............ | G03B 17/02 |
| | | | | 396/439 |
| 2016/0330354 A1 * | 11/2016 | Moriyama | ........... | G03B 17/566 |

\* cited by examiner

MULTIPOLARIZED SIGNAL TERMINAL CONNECTOR FOR ACCESSORY, ACCESSORY SHOE DEVICE, IMAGE PICKUP APPARATUS, AND ACCESSORY

BACKGROUND OF THE INVENTION

Field of the invention

The present invention relates to a signal terminal connector for an accessory, which is applied to an accessory shoe device to which an accessory is attached, an accessory shoe device to which the signal terminal connector for an accessory is applied, an image pickup apparatus, and an accessory.

Description of the Related Art

As an image pickup apparatus, there has been known an image pickup apparatus equipped with an accessory shoe device to which a photographic accessory (hereinafter simply referred to as "the accessory") can be attached. The accessory shoe device of the image pickup apparatus is provided with an engagement portion for attachment of an accessory and an electric connection portion. In recent years, not only an external strobe device, but also various accessories can be attached to the accessory shoe device of the image pickup apparatus.

Examples of these accessories include an electronic viewfinder equipped with a small-sized liquid crystal device. The accessory shoe device to which the electronic viewfinder can be attached is required to have connection terminals for connection to the electronic viewfinder in addition to connection terminals for connection to the external strobe device, within the shape of an engagement member. By being provided with the connection terminals for connection to the external strobe device and the connection terminals for connection to the electronic viewfinder, the external strobe device and the electronic viewfinder can be selectively attached to the single engagement portion.

For example, Japanese Patent No. 4042717 proposes such an accessory shoe device described above, which is equipped with connection terminals for connection to the external strobe device and connection terminals for connection to the electronic viewfinder.

However, the accessory shoe device for attachment of the external strobe device has a shape defined by the standards. More specifically, JIS defines the shape of the engagement portion for engagement with an attachment portion of an accessory and a positional relationship between the shape and a synchronizer contact for the external strobe device.

Further, as for the electronic viewfinder, in recent years, there has been a tendency toward multipolarization, i.e. an increased number of connection terminals for connection to an image pickup apparatus, according to an increasing demand for an increased number of pixels and a higher frame rate. Restrictions related to space are imposed on the multipolarization of the signal terminal connector including the connection terminals for connection to the electronic viewfinder, since the signal terminal connector is required to be accommodated within the shape of the engagement portion of the accessory shoe device. Accordingly, to multipolarize the signal terminal connector, it is envisaged to reduce a pitch between the connection terminals. However, to realize a narrow pitch of the connection terminals, it is necessary to improve the accuracy in positioning the engagement portion of the accessory shoe device and the signal terminal connector for the electronic viewfinder so as to prevent a short circuit between the connection terminals adjacent to each other, which is by no means easy to achieve.

SUMMARY OF THE INVENTION

The present invention provides a multipolarized signal terminal connector for an accessory, which is applied to an accessory shoe device having a defined shape. Further, the present invention provides an accessory shoe device to which this signal terminal connector for an accessory is applied, an image pickup apparatus, and an accessory that is connected to the signal terminal connector for an accessory.

In a first aspect of the invention, there is provided a signal terminal connector for an accessory, comprising a first surface opposed to an attaching direction of an accessory, a first terminal row provided in the first surface, a second surface that is inclined with respect to the first surface by a predetermined angle, and a second terminal row provided in the second surface, wherein the second surface is inclined with respect to the first surface, in a predetermined direction orthogonal to the attaching direction of the accessory and a direction in which terminals of the second terminal row are arranged, and is displaced with respect to the first surface in the predetermined direction.

In a second aspect of the invention, there is provided an accessory shoe device including an engagement member to which an accessory is attached, signal terminals for an external strobe that is attached to the engagement member, and a signal terminal connector for an accessory, wherein the signal terminal connector comprises a first surface opposed to an attaching direction of an accessory, a first terminal row provided in the first surface, a second surface that is inclined with respect to the first surface by a predetermined angle, and a second terminal row provided in the second surface, wherein the second surface is inclined with respect to the first surface, in a predetermined direction orthogonal to the attaching direction of the accessory and a direction in which terminals of the second terminal row are arranged, and is displaced with respect to the first surface in the predetermined direction.

In a third aspect of the invention, there is provided an image pickup apparatus including an accessory shoe device, wherein the accessory shoe device includes an engagement member to which an accessory is attached, signal terminals for an external strobe that is attached to the engagement member, and a signal terminal connector for an accessory, wherein the signal terminal connector comprises a first surface opposed to an attaching direction of an accessory, a first terminal row provided in the first surface, a second surface that is inclined with respect to the first surface by a predetermined angle, and a second terminal row provided in the second surface, wherein the second surface is inclined with respect to the first surface, in a predetermined direction orthogonal to the attaching direction of the accessory and a direction in which terminals of the second terminal row are arranged, and is displaced with respect to the first surface in the predetermined direction.

In a fourth aspect of the invention, there is provided an accessory including a connection plug connected to a signal terminal connector for an accessory, wherein the signal terminal connector comprises a first surface opposed to an attaching direction of an accessory, a first terminal row provided in the first surface, a second surface that is inclined with respect to the first surface by a predetermined angle, and a second terminal row provided in the second surface, wherein the second surface is inclined with respect to the first surface, in a predetermined direction orthogonal to the attaching direction of the accessory and a direction in which terminals of the second terminal row are arranged, and is displaced with respect to the first surface in the predetermined direction, and wherein the connection plug includes terminals for connection to terminals of the first terminal row of the signal terminal connector and terminals for connection to the terminals of the second terminal row of the signal terminal connector.

According to the present invention, it is possible to provide the multipolarized signal terminal connector for an accessory, which is applied to the accessory shoe device having a defined shape. Further, according to the present invention, it is possible to provide the accessory shoe device to which the multipolarized signal terminal connector for an accessory is applied, the image pickup apparatus, and the accessory that is connected to the signal terminal connector for an accessory.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
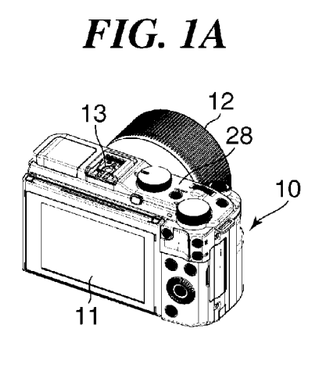
FIG. 1A is a rear perspective view of an image pickup apparatus according to an embodiment of the present invention.
Figure 1B:
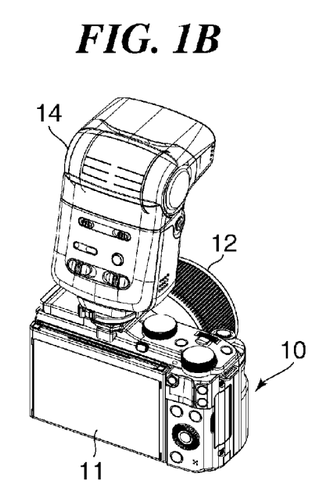
FIG. 1B is a rear perspective view of the image pickup apparatus with an external strobe device attached thereto.
Figure 1C:
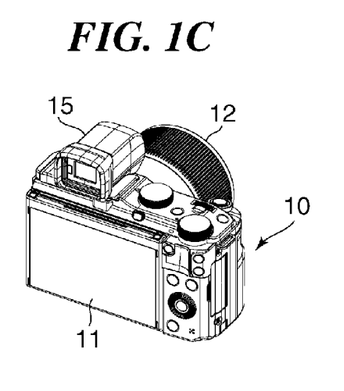
FIG. 1C is a rear perspective view of the image pickup apparatus with an external display device attached thereto.
Figure 1D:
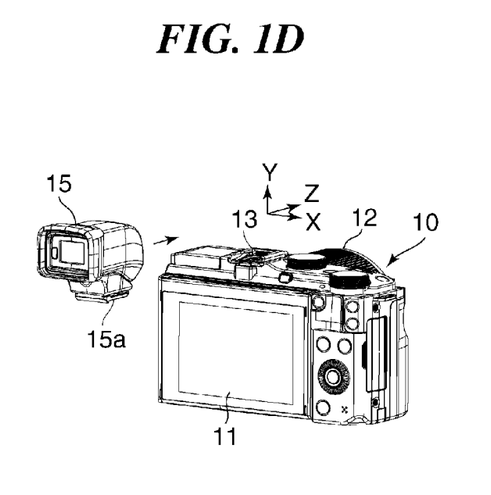
FIG. 1D is a view showing how the external display device is attached to an accessory shoe device of the image pickup apparatus.

FIGS. 1A to 1D are views of an image pickup apparatus according to an embodiment. FIG. 1A is a rear perspective view of the image pickup apparatus, and FIG. 1B is a rear perspective view of the image pickup apparatus with an external strobe device attached thereto. Further, FIG. 1C is a rear perspective view of the image pickup apparatus with an external display device attached thereto, and FIG. 1D is a view showing how the external display device is attached to an accessory shoe device of the image pickup apparatus.

As shown in FIG. 1A, the image pickup apparatus, denoted by reference numeral 10, is provided with a lens barrel 12 for taking an object image into an image pickup device, not shown, a liquid crystal monitor 11, the accessory shoe device (hereinafter simply referred to as "the accessory shoe"), denoted by reference numeral 13, and a top cover 28. A user of the image pickup apparatus 10 can check an object image by the liquid crystal monitor 11. The accessory shoe 13 as an accessory mount forms a portion of the top cover 28 as an exterior member.

In FIG. 1B, the accessory shoe 13 of the image pickup apparatus 10 has the external strobe device (hereinafter simply referred to as "the external strobe"), denoted by reference numeral 14, attached to thereto as an accessory. The external strobe 14 is used to irradiate an object with light for shooting. Further, in FIG. 1C, the accessory shoe 13 of the image pickup apparatus 10 has an electronic viewfinder 15 attached thereto as an external display device equipped with a small-sized liquid crystal device. The user of the image pickup apparatus 10 can check an object image to be taken into the image pickup device, by the electronic viewfinder 15, similarly to the case of using the liquid crystal monitor 11.

As shown in FIG. 1D, the electronic viewfinder 15 is equipped with a connection plug 15a for connection to the accessory shoe 13 provided in the body of the image pickup apparatus 10. The electronic viewfinder 15 is attached to the image pickup apparatus 10 by sliding the same in a Z direction indicated by an arrow appearing in FIG. 1D, to cause the connection plug 15a to be engaged with the accessory shoe 13. The sliding direction corresponds to a direction from the rear i.e. the liquid crystal monitor side of the image pickup apparatus 10 toward the lens barrel 12.

Next, a description will be given of the arrangement of the accessory shoe 13 of the image pickup apparatus 10.

Figure 2:
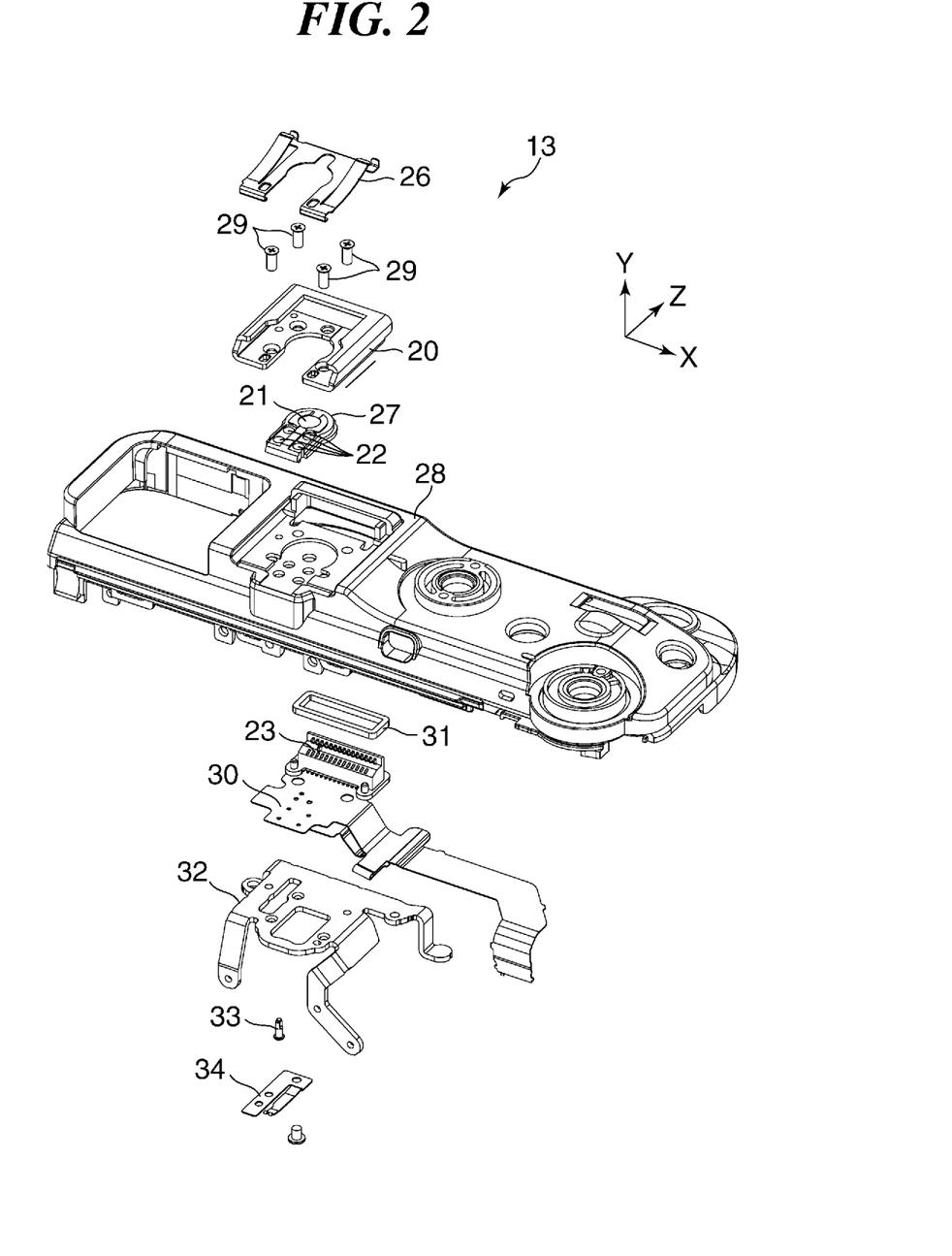
FIG. 2 is an exploded perspective view of the accessory shoe device of the image pickup apparatus shown in FIGS. 1A to 1D.

FIG. 2 is an exploded perspective view showing the arrangement of the accessory shoe 13 of the image pickup apparatus 10 shown in FIGS. 1A to 1D.

In FIG. 2, the Z direction indicated by an arrow Z corresponds to a direction in which an accessory is attached to the accessory shoe 13. An X direction indicated by an arrow X corresponds to a direction orthogonally intersecting the accessory attaching direction and parallel to the longitudinal direction of the top cover 28. A Y direction indicated by an arrow Y corresponds to a direction orthogonally intersecting the accessory attaching direction and the longitudinal direction of the top cover 28, and this direction corresponds to a direction in which the accessory shoe 13 is assembled to the top cover 28. Note that the top cover 28 is an exterior member forming the appearance of the top surface of the image pickup apparatus 10.

The accessory shoe 13 is mainly comprised of an engagement member 20, a signal terminal stage 27 for the external strobe 14, a signal terminal connector 23 for an accessory (hereinafter simply referred to as the "signal terminal connector"), and an accessory shoe spring 26.

The engagement member 20 is a member for holding the external strobe 14 or the electronic viewfinder 15 as an accessory, by engagement therewith. The signal terminal stage 27 for an external strobe (hereinafter simply referred to as "the signal terminal stage 27") is made of a synthetic resin material, and a synchronizer contact 21 and a plurality of contacts 22 are held on the signal terminal stage 27. The signal terminal stage 27 is positioned by a positioning portion of the engagement member 20. The signal terminal stage 27 is a terminal for communication of a signal with an external strobe device.

The signal terminal connector 23 for the electronic viewfinder 15 is provided with a plurality of connection terminals arranged side by side at the same pitch in the X direction as the pitch direction on a connector base member made of a synthetic resin material. The connection terminals will be described in detail hereinafter.

Each of the synchronizer contact 21 and the plurality of contacts 22 of the signal terminal stage 27, and the connection terminals of the signal terminal connector 23 is electrically joined to a flexible circuit board 30 disposed below the top cover 28. The flexible circuit board 30 is connected to a main circuit board, not shown, of the image pickup apparatus 10, and is configured to be electrically connectable to the external strobe 14 and the electronic viewfinder 15. This enables the external strobe 14 or the electronic viewfinder 15 attached to the engagement member 20 to communicate with the image pickup apparatus 10.

A packing member 31 is disposed in a manner surrounding the whole periphery of the signal terminal connector 23. The packing member 31 is made of an elastic member, such as a rubber member, which can be largely deformed by a small force and has a large elastic deformation range.

An accessory shoe holding member 32 disposed below the top cover 28 is a structural framework for holding the engagement member 20, and is positioned with respect to the top cover 28 by a fastening portion. The fastening portion is provided with four screws 29, for example, and each of the screws 29 extends to the accessory shoe holding member 32 through the engagement member 20, the top cover 28, and the flexible circuit board 30, each appearing in FIG. 2, and is fastened to the accessory shoe holding member 32.

The signal terminal stage 27 has an outer periphery thereof sandwiched by the engagement member 20 and the top cover 28, whereby the signal terminal stage 27 is fixed to the top cover 28. The signal terminal connector 23 is sandwiched by the top cover 28 and the accessory shoe holding member 32, whereby the packing member 31 is crushed to fill a gap between the top cover 28 and the signal terminal connector 23.

The accessory shoe spring 26 is formed of a conductive metal material. The accessory shoe spring 26 has elastic deformation portions for urging an accessory attached to the engagement member 20 in the Y direction and abutment surfaces which the accessory is caused to abut in the Z direction. The top cover 28 is formed with a slide hole, and a detection pin 33 is inserted through the slide hole for contact with the accessory shoe spring 26.

A contact piece member 34 is disposed at a location opposed to the accessory shoe spring 26 with the detection pin 33 therebetween. When there is no accessory attached to the accessory shoe 13, the contact piece member 34 is in contact with a pattern (not shown) on the flexible circuit board 30. When an accessory is attached to the accessory shoe 13, the detection pin 33 is pressed down in the Y direction by the accessory shoe spring 26. As a consequence, the contact piece member 34 is moved away from the pattern on the flexible circuit board 30, whereby attachment of the accessory is detected. Thus, the attachment of the accessory to the image pickup apparatus 10 is detected, whereafter the attached accessory is synchronized with the image pickup apparatus 10.

Figure 3A:
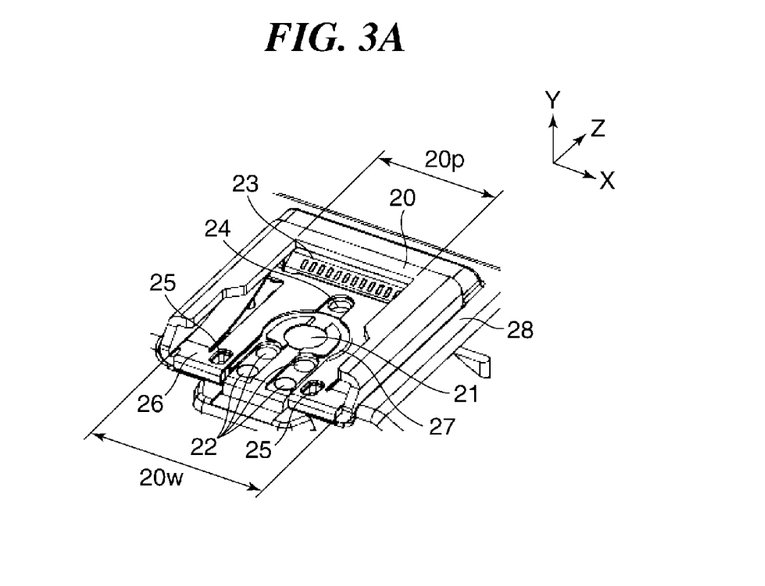
FIG. 3A is a perspective view of the accessory shoe device.
Figure 3B:
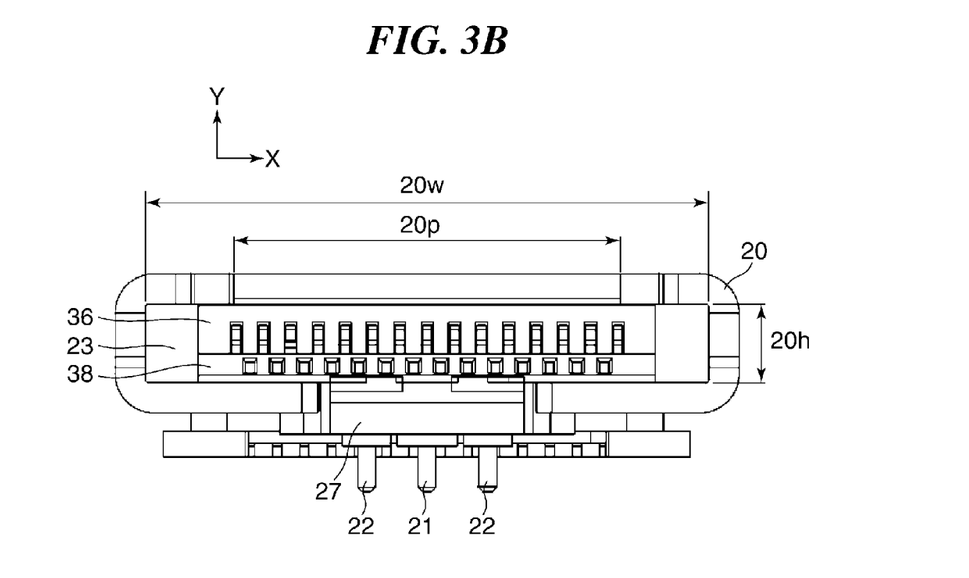
FIG. 3B is a front view of the accessory shoe device shown in FIG. 3A, as viewed in a Z direction.

FIGS. 3A and 3B are views useful in explaining the accessory shoe 13, in which FIG. 3A is a perspective view of the accessory shoe 13, and FIG. 3B is a front view of the accessory shoe 13 shown in FIG. 3A, as viewed in the Z direction.

Referring to FIG. 3A, the engagement member 20 is a member for holding the external strobe 14 or the electronic viewfinder 15 by engagement therewith. The engagement member 20 is formed with an engagement portion spacing $20p$ and an inner side wall spacing $20w$, for allowing attachment of the connection plug 15a of the electronic viewfinder 15. Inside the engagement member 20, there is provided the signal terminal stage 27 for connection to the external strobe 14. The synchronizer contact 21 is disposed in a central part of the signal terminal stage 27, and the plurality of contacts 22 are arranged in the vicinity of the synchronizer contact 21. The synchronizer contact 21 and the contacts 22 are communication terminals for controlling the external strobe 14.

The signal terminal connector 23 applied to the accessory shoe 13 is disposed forward of the synchronizer contact 21, as viewed in the attaching direction of the electronic viewfinder 15, i.e. in the direction indicated by the arrow Z. Between the synchronizer contact 21 and the signal terminal connector 23, there is formed a first engagement hole 24. The first engagement hole 24 is engaged with a lock pin (not shown) provided on the external strobe 14 to thereby prevent the external strobe 14 from failing off from the image pickup apparatus 10. Further, in the vicinity of the contacts 22 of the signal terminal stage 27, there are formed second engagement holes 25. The second engagement holes 25 are engaged with respective lock pins provided on the electronic viewfinder 15 to thereby prevent the electronic viewfinder 15 from falling off from the image pickup apparatus 10.

Referring to FIG. 3B, the engagement member 20 has the engagement portion spacing $20p$, the inner side wall spacing $20w$, and an engagement portion height $20h$, for allowing attachment of the connection plug 15a of the electronic viewfinder 15.

In a general-purpose accessory shoe, the engagement portion spacing $20p$, the inner side wall spacing $20w$, and the engagement portion height $20h$ are defined by the standards. In other words, in a connection plug of an accessory to be engaged with the accessory shoe 13, an external shape of a connection section including connection terminals for connection to the signal terminal connector 23 is required to be accommodated within a range determined by the engagement portion spacing $20p$, the inner side wall spacing $20w$, and the engagement portion height $20h$ of the engagement member 20. On the other hand, the connection terminals of the multipolarized signal terminal connector 23 are required to be configured such that contact portions thereof are exposed from within a plane defined by the engagement portion height 20h and the engagement portion spacing 20p.

To meet this requirement, in the present embodiment, the signal terminal connector 23 is disposed forward of the synchronizer contact 21 of the signal terminal stage 27 in the Z direction, and is provided with a first contact surface 36 opposed to the Z direction and a second contact surface 38 which is inclined with respect to the first contact surface 36 by a predetermined angle. The connection terminals are provided in the first and second contact surfaces 36 and 38, and the connection terminals on the first contact surface 36 and the connection terminals on the second contact surface 38 are displaced by a half pitch in a staggered arrangement. Details of the arrangement of the connection terminals will be described hereinafter.

Figure 4A:
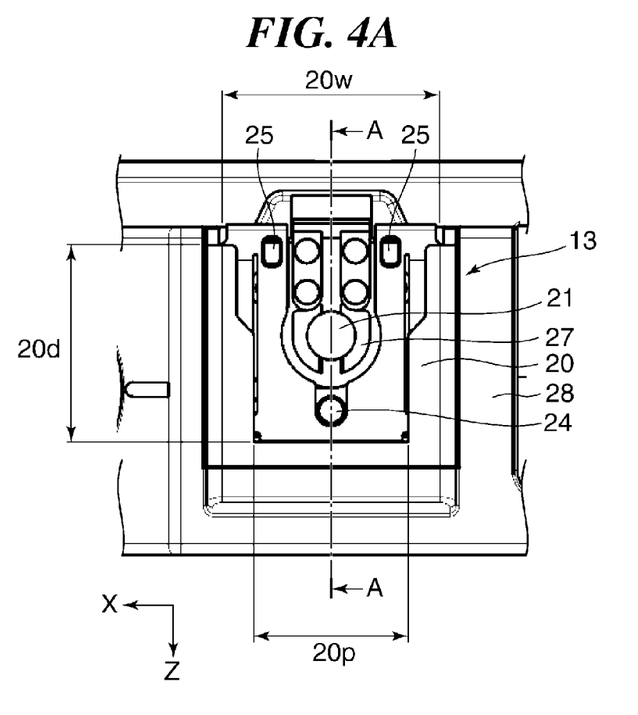
FIG. 4A is a plan view of the accessory shoe device.
Figure 4B:
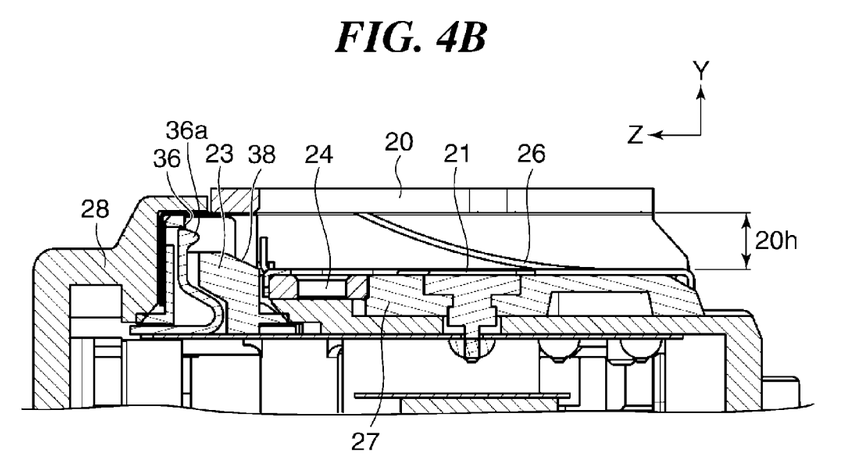
FIG. 4B is a cross-sectional view taken along A-A of FIG. 4A.

FIGS. 4A and 4B are views useful in explaining the accessory shoe 13, in which FIG. 4A is a plan view of the accessory shoe 13, and FIG. 4B is a cross-sectional view taken along A-A of FIG. 4A.

Referring to FIG. 4A, a general-purpose accessory shoe fixed to the top cover 28 has the engagement portion spacing 20p, the inner side wall spacing 20w, and an engagement portion length 20d of the engagement member 20, defined by the standards. The synchronizer contact 21 for connection to an external strobe is located in a substantially central part of the engagement member 20. The positional relationship between the synchronizer contact 21 and the engagement member 20 is also defined. A general-purpose external strobe can be attached insofar as it is in conformity with these requirements.

Referring to FIG. 4B, the engagement portion height 20h of the engagement member 20 fixed to the top cover 28 is defined by the standards. The synchronizer contact 21 arranged within the engagement member 20 is held by the signal terminal stage 27 made of a synthetic resin material. The signal terminal connector 23 is disposed forward of the signal terminal stage 27 and the first engagement hole 24 in the Z direction which is the attaching direction of the electronic viewfinder 15. A contact surface 36 of the signal terminal connector 23 is located upward of the signal terminal stage 27 in the Y direction, and is within the engagement portion height 20h inside the engagement member 20.

Next, a description will be given of the arrangement of the signal terminal connector 23, and more particularly of the connection terminals of the signal terminal connector 23.

Figure 5A:
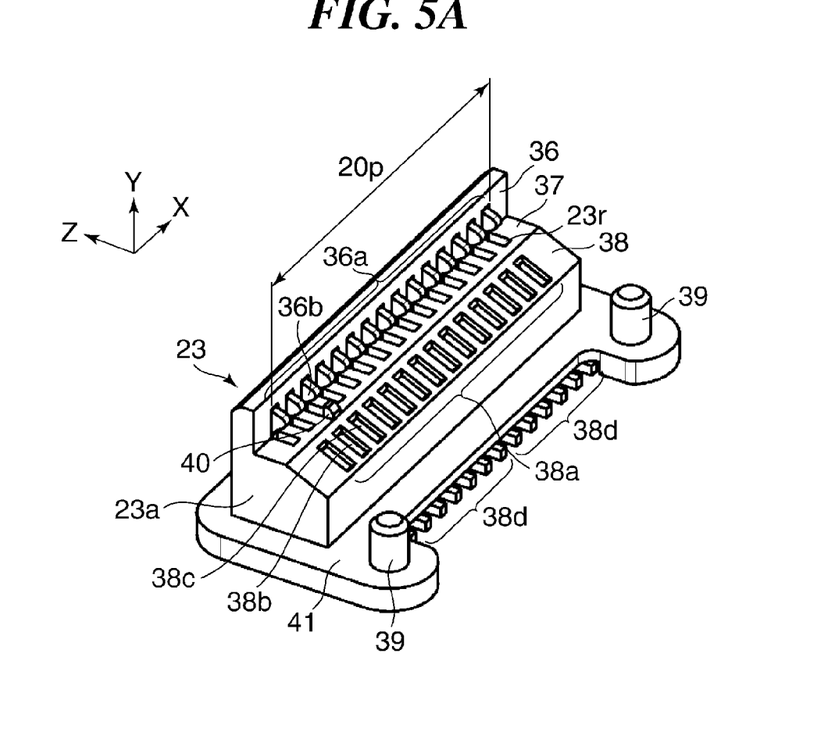
FIG. 5A is a perspective view of a signal terminal connector.
Figure 5B:
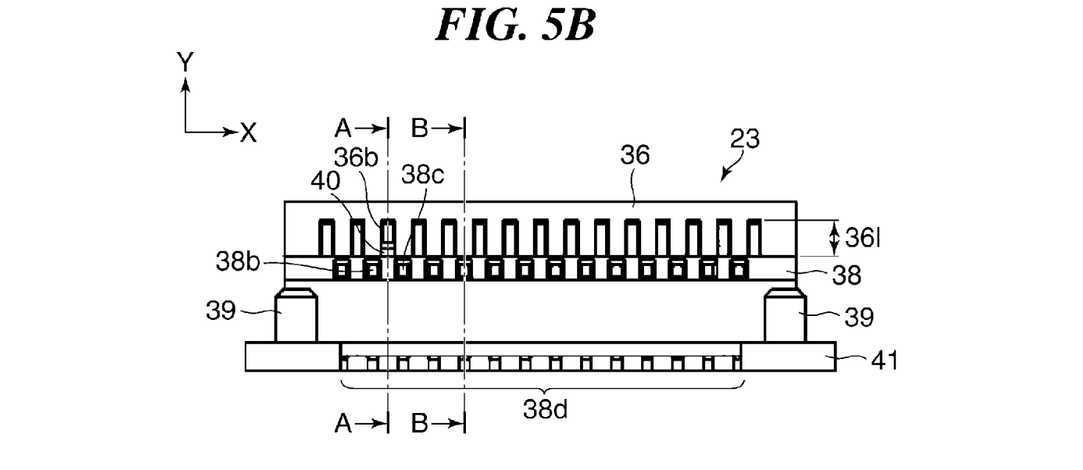
FIG. 5B is a front view of the signal terminal connector shown in FIG. 5A, as viewed in the Z direction.

FIGS. 5A and 5B are views useful in explaining the signal terminal connector 23, in which FIG. 5A is a perspective view of the signal terminal connector 23, and FIG. 5B is a front view of the signal terminal connector 23 shown in FIG. 5A, as viewed in the Z direction.

Referring to FIGS. 5A and 5B, the width of the signal terminal connector 23 in the X direction is larger than the engagement portion spacing 20p in the engagement member 20, whereby the signal terminal connector 23 is compatible with a connection plug of an electronic viewfinder, which is multipolarized as the number of pixels is increased and the frame rate becomes higher.

The signal terminal connector 23 includes a resin housing 23a, and the resin housing 23a is formed with the first contact surface 36 extending along the X direction orthogonally intersecting the Z direction which is the attaching direction of the electronic viewfinder 15. A first terminal row 36a formed by a plurality of connection terminals (hereinafter simply referred to as the "terminals" as deemed appropriate) each including a contact portion 36n is exposed from the first contact surface 36. The resin housing 23a is formed with the second contact surface 38 on the near side in the attaching direction of the electronic viewfinder 15 in a manner displaced downward from the first contact surface 36 in the Y direction orthogonal to the X direction, which is inclined in the Y direction (predetermined direction) with respect to the first contact surface 36 by a predetermined angle. Note that assuming that a side closer to the first contact surface 36 in an inclination direction of the second contact surface 38 is an upper side, a lower side in the Y direction is a far side from the first contact surface 36 in the inclination direction of the second contact surface 38. The predetermined angle is an angle within a range of e.g. 90 to 180 degrees. A second terminal row 38a formed by a plurality of connection terminals (hereinafter simply referred to as the "terminals" as deemed appropriate) each including a contact portion 38n is exposed from the second contact surface 38. The first terminal row 36a and the second terminal row 38a are held by the resin housing 23a. The terminals of the first terminal row 36a and the terminals of the second terminal row 38a are in a staggered arrangement in which the terminals are arranged in a staggered relation to each other. The terminals of the first terminal row 36a and the terminals of the second terminal row 38a are aligned in respective rows in the X direction.

The second contact surface 38 is a surface inclined with respect to the first contact surface 36 e.g. by 120 degrees. Between the first contact surface 36 and the second contact surface 38, there is formed a third surface 37. On the third surface 37, there is provided a fitting key 40 as a fitting member for regulating fitting relationship between the signal terminal connector 23 and the connection plug 15a of the electronic viewfinder 15. At least one of three terminals, i.e. a terminal 36b of the first row 36a, and terminals 38b and 38c of the second row 38a, which are located in the vicinity of the fitting key 40, e.g. at respective locations forward and rearward of the fitting key 40 in the X direction, functions as a detection signal terminal for detecting connection of the connection plug 15a of the electronic viewfinder 15.

Unless the detection signal terminal detects connection of the electronic viewfinder 15 to the image pickup apparatus 10, communication between the electronic viewfinder 15 and the image pickup apparatus 10 is not permitted. Therefore, for example, even when connection plugs and signal terminal connectors having respective identical shapes are used for two different image pickup apparatuses and two different accessories, by changing the position of the fitting key, it is possible to easily define a proper combination of a signal terminal connector and a connection plug. With the arrangement for regulating a plug to be attached using the fitting key 40 formed on the third surface 37 adjacent to the first contact surface 36 or the second contact surface 38, it is possible, for example, to select one of the above-mentioned three terminals as the detection signal terminal, and hence the degree of freedom for selection is increased.

The signal terminal connector 23 has a flange 41 formed around the whole periphery thereof at a location upward of a lead portion 36d (described hereinafter with reference to FIG. 6A) of each terminal of the first terminal row 36a electrically connected to the flexible circuit board 30 (see FIG. 2A; the lead portion 36d of the terminal 36b appears in FIG. 2A), and a lead portion 38d of each terminal of the second terminal row 38a. The lead portions 36d and 38d are exposed from the resin housing 23a. The flange 41 is formed with a pair of positioning portions 39 protruding in the Y direction. The positioning portions 39 are located outward of lead portions 36d and 38d which are joined to the printed wiring board 30, in the X direction, and also are located in a projection area of the engagement member 20 in which a shadow thereof is imaginarily projected in the Y direction. The positioning portions 39 position the signal terminal connector 23 and the engagement member 20 with respect to each other. That is, the positioning portions 39 of the signal terminal connector 23 are engaged with engagement holes, not shown, of the engagement member 20, whereby the signal terminal connector 23 is directly positioned with respect to the engagement member 20. Therefore, when the electronic viewfinder 15 is attached, the position of the connection plug 15a of the electronic viewfinder 15 with respect to the signal terminal connector 23 is determined in one-to-one relationship.

Next, a description will be given of details of the connection terminals of the signal terminal connector 23.

Figure 6A:
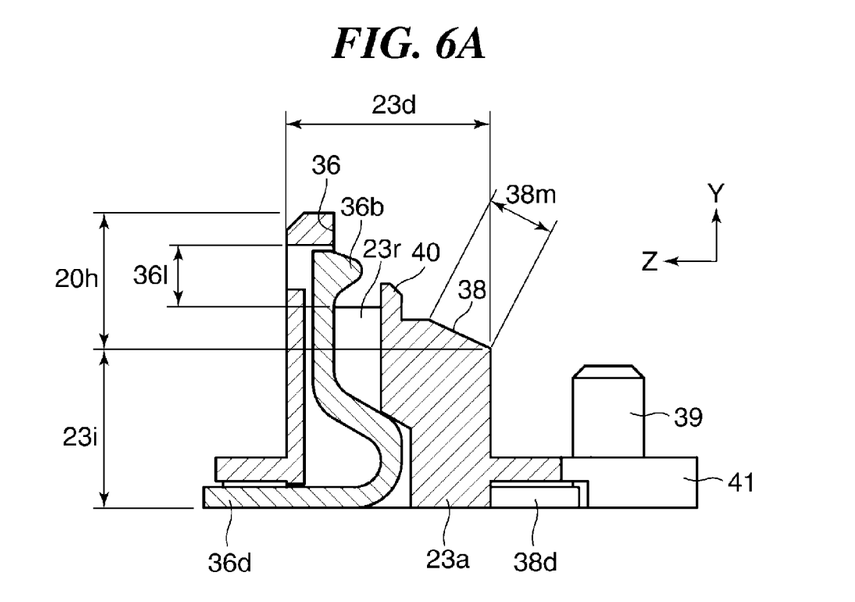
FIG. 6A is a cross-sectional view of a connection terminal of the signal terminal connector, taken along A-A of FIG. 5B.
Figure 6B:
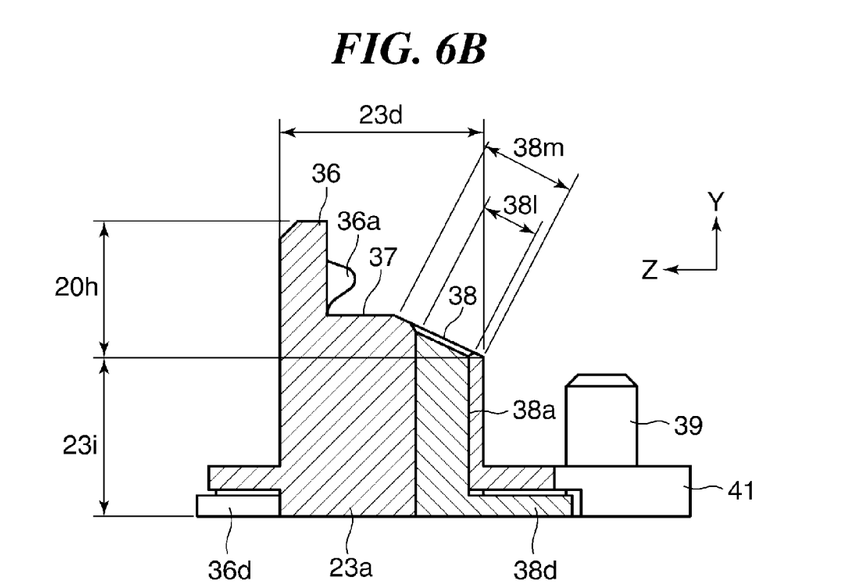
FIG. 6B is a cross-sectional view of the connection terminal of the signal terminal connector taken along B-B of FIG. 5B.

FIGS. 6A and 6B are views of the connection terminals of the signal terminal connector 23, in which FIG. 6A is a cross-sectional view taken along A-A of FIG. 5B, and FIG. 6B is a cross-sectional view taken along B-B of FIG. 5B.

Referring to FIG. 6A, the first contact surface 36 orthogonally intersecting the direction which is the attaching direction of the electronic viewfinder 15. The first contact surface 36 is located upward of the second contact surface 38 in the Y direction. A height 23i of a portion of the signal terminal connector 23 lower than a ridgeline of the second contact surface 38 is substantially equal to the height of the signal terminal stage 27, appearing in FIG. 2. The connection terminals of the first terminal row 36a and the connection terminals of the second terminal row 38a of the signal terminal connector 23 are required to have contact portions (indicated by 36n in FIG. 8 and 38n in FIG. 7B, respectively) exposed from within a plane formed by the engagement portion height 20h and the engagement portion spacing 20p, described with reference to FIG. 3B. Therefore, a height of a portion upper than the ridgeline of the second contact surface 38 is defined by the engagement portion height 20h of the engagement member 20. Note that the lower ridgeline of the inclined surface of the second contact surface 38 is at the same level as the lower surface of the connection plug 15a of the accessory.

The third surface 37 is formed with holes 23r. The first terminal row 36a formed by the terminals including the terminal 36b is inserted into the housing 23a of the signal terminal connector 23 from the lower side in the Y direction and also from the side of the flange 41, to be assembled thereto, thereby being held therein. The holes 23r are formed in the third surface 37 in a manner associated with the respective terminals, and hence when the first terminal row 36a is assembled to the housing 23a of the signal terminal connector 23, the contact portions do not interfere with the housing 23a. The fitting key 40 is formed on the third surface 37 in a manner avoiding the plurality of holes 23r.

Referring to FIG. 6B, the second contact surface 38 is inclined with respect to the first contact surface 36 by a predetermined angle of e.g. 120 degrees. Since the third surface 37 is formed with the holes 23r (see FIG. 5A), the third surface 37 is required to have a certain length. Therefore, to accommodate the size of the signal terminal connector 23 within a certain range, a restriction is imposed on the dimension in the direction orthogonal to the pitch direction which is the arrangement direction of the connection terminals of the second terminal row 38a on the second contact surface 38.

To meet this requirement, in the present embodiment, to ensure a length 38m orthogonal to the pitch direction of the second contact surface 38, the second contact surface 38 is inclined with respect to the first contact surface 36 by the predetermined angle. This makes it possible to sufficiently ensure a contact length 38l of the contact surface of each terminal of the second terminal row 38a.

Further, by optimizing the inclination angle, the first contact surface 36 and the second contact surface 38 are accommodated within the engagement portion height 20h inside the engagement member 20 at respective locations upward of the signal terminal stage 27 in the Y direction.

Further, for example, assuming that the fitting key 40 is provided outward of the first terminal row 36a and the second terminal row 38a in the terminal pitch direction, the signal terminal connector 23 is increased in size. As shown in FIG. 6A, the fitting key 40 is provided on the third surface 37 within the range defined by the opposite ends of the first terminal row 36a and the second terminal row 38a, the fitting key 40 can be provided without affecting the terminal pitch. With this arrangement, the signal terminal connector 23 can be multipolarized within the range of the accessory shoe 13 having the defined shape of the engagement member 20 without increasing its size.

Next, a description will be given of a state in which the connection plug 15a of the electronic viewfinder 15 has been attached to the accessory shoe 13.

Figure 7A:
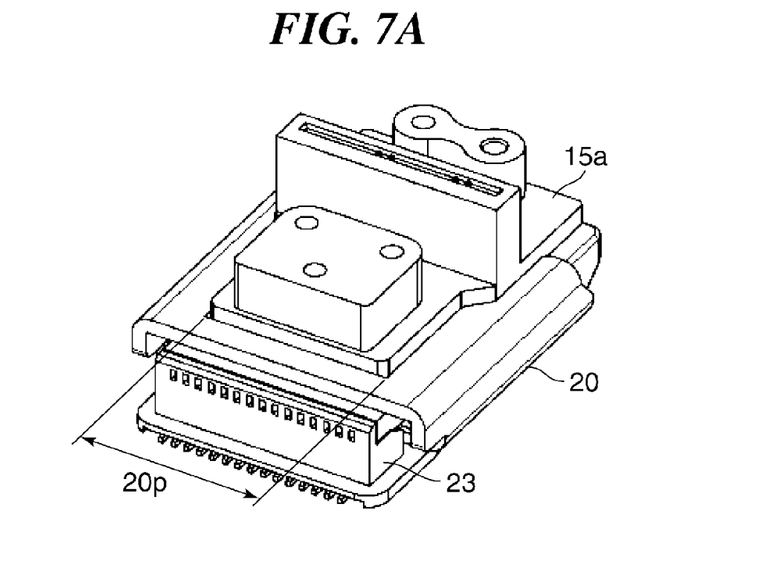
FIG. 7A is a perspective view of a connection plug of an electronic viewfinder in a state attached to an engagement member of the accessory shoe device.
Figure 7B:
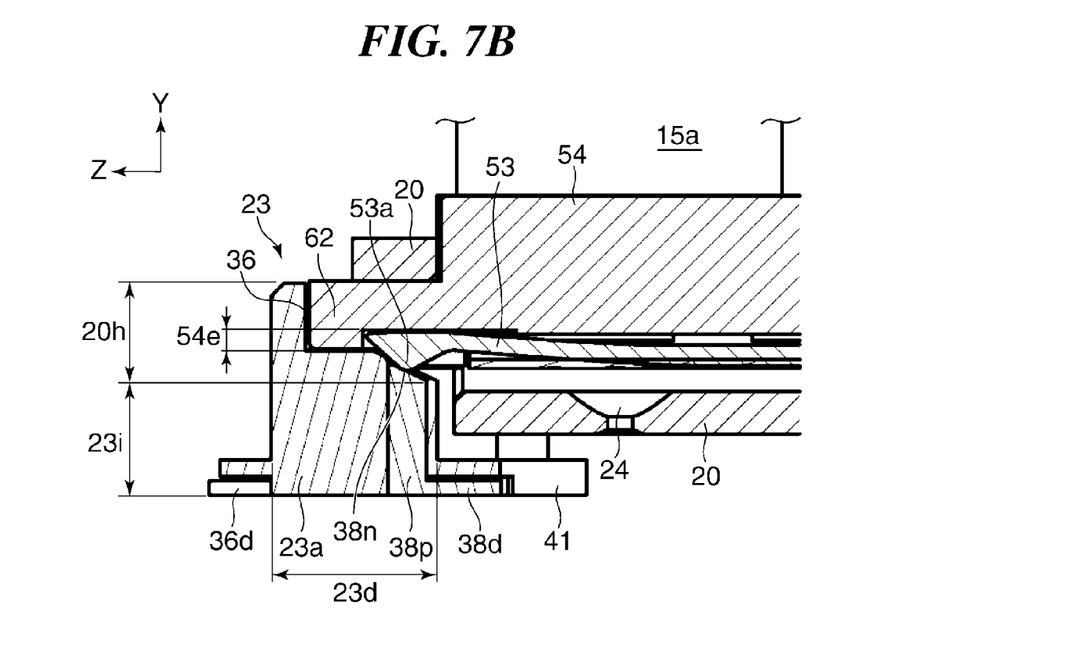
FIG. 7B is a cross-sectional view showing a connection state between a second terminal row of the signal terminal connector and terminals of the connection plug.

FIGS. 7A and 7B are views useful in explaining the state in which the connection plug 15a of the electronic viewfinder 15 has been attached to the engagement member 20 of the accessory shoe 13, in which FIG. 7A is a perspective view, and FIG. 7B is a cross-sectional view of a Y-Z plane showing the connection state between the second terminal row 38a of the signal terminal connector 23 and terminals of the connection plug 15a (plug terminals 53, referred to hereinafter).

Referring to FIG. 7A, the connection plug 15a of the electronic viewfinder 15 is attached to the engagement member 20 of the accessory shoe 13 including the signal terminal connector 23 having the width in the X direction larger than the engagement portion spacing 20p.

Further, FIG. 7B shows the cross section taken along B-B of FIG. 5B, showing the connection state between the second terminal row 38a of the signal terminal connector 23 and the terminals of the connection plug 15a. The plug terminals 53 provided on the connection plug 15a of the electronic viewfinder 15 have front-end portions 53a brought into contact with the contact surface of each terminal (the terminal 38b in FIG. 7B) of the second terminal row 38a of the signal terminal connector 23. As the connection plug 15a is moved in the Z direction when being attached to the engagement member 20, the front-end portions 53a of the plug terminals 53 each perform a so-called wiping operation in which it moves on the contact surface within the contact length 38l (see FIG. 6B) of the contact portion 38n of each terminal of the signal terminal connector 23.

By sufficiently securing the contact length 38l of the contact surface of each terminal of the second terminal row 38a and performing the wiping operation, it is possible to eliminate foreign matter attached to the contact surface of each terminal of the second terminal row 38a to thereby obtain stable contact. Further, by inclining the second contact surface 38 with respect to the first contact surface 36, it is possible to ensure the effective contact length 38l of the contact surface of each terminal of the second terminal row 38a, which is relatively long with respect to a length 23d (see FIG. 6B) of the signal terminal connector 23 in the Z direction. This makes it easy to form one of the terminals of the second terminal row 38a as a GND terminal, and connect the GND terminal to a terminal on the connection plug side prior to the other terminals of the second terminal row 38a.

As a result, it is possible to reduce noise which is liable to be generated when the front-end portions 53a of the plus terminals 53 are brought into contact with the contacts of the terminals 38b.

A base portion 54 of the connection plug 15a is formed with an escape space 54e for displacement of the front-end portions 53a of the plug terminals 53 in the Y direction within a height of a flat surface 62 opposed to the first contact surface 36 of the signal terminal connector 23.

The front-end portion 53a of each plug terminal 53 functions as a movable terminal which is displaced in the Y direction within the escape space 54e formed in the base portion 54. As a result, the contact portion 38n of each terminal of the second terminal row 38a of the signal terminal connector 23 can be formed as a fixed terminal which is not displaced. As the connection plug 15a is moved in the Z direction when being attached to the engagement member 20, the front-end portions 53a of the plug terminals 53 are brought into contact with the contact portions 38n of the terminals of the second terminal row 38a of the signal terminal connector 23, and is displaced in the Y direction, whereby the front-end portions 53a receive the contact pressure generated between the terminals in contact with each other. Then, the contact portions between the front-end portions 53a and the contact portions 38n of the terminals of the second terminal row 38a are moved, whereby foreign matter attached to the contact surfaces is eliminated, and the stable contact state can be obtained.

Next, a description will be given of the connection state between the first terminal row 36a of the signal terminal connector 23 and the terminals of the connection plug 15a.

Figure 8:
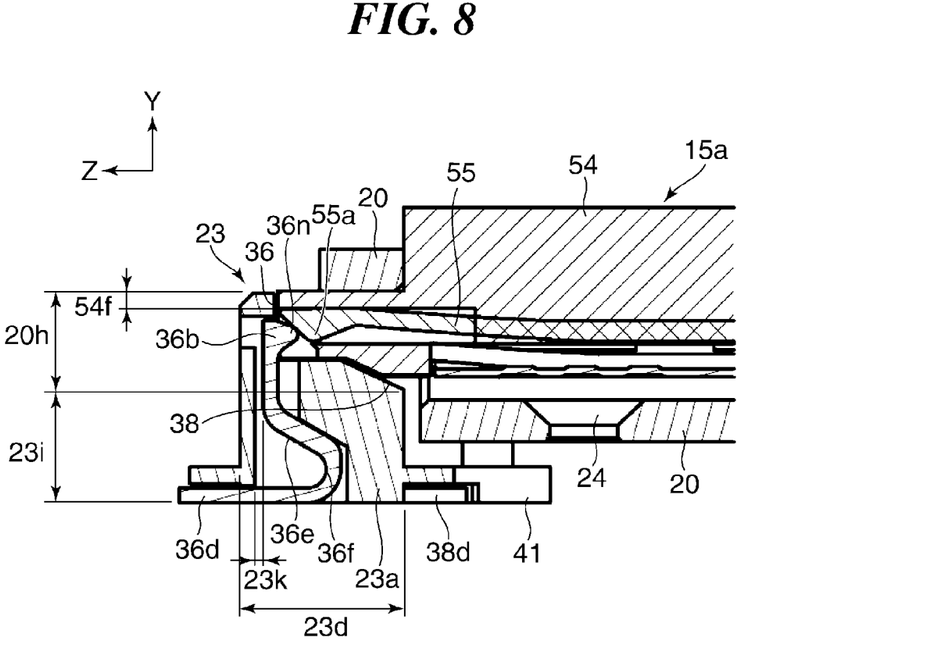
FIG. 8 a cross-sectional view, taken along the Z direction, which is useful in explaining an attached state of the connection plug of the electronic viewfinder to the engagement member of the accessory shoe device, in which a first terminal row of the signal terminal connector and the terminals of the connection plug are connected.

FIG. 8 is a cross-sectional view of a Y-Z plane useful in explaining the state in which the connection plug 15a of the electronic viewfinder 15 has been attached to the engagement member 20 of the accessory shoe 13, showing the connection state between the terminals of the first terminal row 36a of the signal terminal connector 23 and one (plug terminal 55) of the terminals of a terminal row 61, referred to hereinafter, of the connection plug 15a.

FIG. 8 is a cross-sectional view taken along A-A of FIG. 5B, and shows the connection state between the first terminal row 36a of the signal terminal connector 23 and the plug terminal 55 of the connection plug 15a.

The plug terminals 55 provided on the connection plug 15a of the electronic viewfinder 15 have front end portions 55a brought into contact with the contact portions 36n of the terminals 36b of the signal terminal connector 23. The base portion 54 of the connection plug 15a is required to have an external shape accommodated within the engagement portion spacing 20p, the inner side wall spacing 20w, and the engagement portion height 20h so as to be engaged with a general-purpose accessory shoe (see FIG. 3B).

The base portion is formed with a front-end protection portion 54f at a location above the front-end portion 55a of the plug terminal 55 of the connection plug 15a. Therefore, it is impossible to form an escape space for displacement of the front-end portion 55a of the plug terminal 55. As a result, each of the plug terminals forming a terminal row 61 (see FIG. 9B), including the plug terminal 55, for connection to the first terminal row 36a, is formed as a fixed terminal.

Each terminal of the first terminal row 36a is formed with an arm portion 36e as an intermediate portion extending from the contact portion 36n toward the lead portion 36d. The arm portion 36e is substantially parallel to the second contact surface 38, and is in contact with part of the inner wall surface of the inner space of the resin housing 23a. The arm portion 36e is made larger in width than the other portions. Further, between the arm portion 36e and the lead portion 36d, there is formed a U-shaped portion 36f. The U-shaped portion 36f, which is an elastic deformation portion, is formed to have a narrower width in its cross-section than the portions other than the elastic deformation portion, such as the arm portion 36e and the lead portion 36d. Therefore, when a load is applied to the contact portion 36n, the U-shaped portion 36f of the terminal 36b is elastically deformed, whereby the contact portion 36n is displaced. That is, the terminals of the first terminal row 36a including the terminal 36b are movable terminals each having a contact which is displaced.

The arm portion 36e and the U-shaped portion 36f are arranged within a range of the height 23i lower than the ridgeline of the second contact portions 38n (see FIG. 7B). The lead portions 36d of the first terminal row 36a including the terminal 36b are joined to the flexible circuit board 30, whereby the position of each lead portion 36d is restrained. On the other hand, since each terminal 36b has the U-shaped portion 36f and the arm portion 36e, the contact portion 36n of the terminal can be displaced within a space in the Y direction. Thus, each of the terminals of the first terminal row 36a including the terminal 36b can obtain the contact pressure as a movable terminal having a front end which is displaced.

The resin housing 23a and the first terminal row 36a including the terminal 36b are required to be accommodated within the engagement portion height 20h. Therefore, the resin housing 23a is formed with an escape space 23k in the Z direction, for displacement of the contact portions 36n of the terminals of the first terminal row 36a. The contact portion 36n of each terminal of the first terminal row 36a is displaced in the Y direction and is also displaced in the Z direction since the U-shaped portion 36f is elastically deformed. With this, the first terminal row 36a functions as a row of movable terminals in each of which the U-shaped portion 36f is elastically deformed and also the contact portion 36n is displaced. With this arrangement, it is possible to multipolarize the signal terminal connector 23 applied to the accessory shoe 13, according to the demand for an increased number of pixels and a higher frame rate, without increasing the size of the signal terminal connector 23.

Next, a description will be given of the connection plug 15a of the electronic viewfinder 15 connected to the signal terminal connector 23.

Figure 9A:
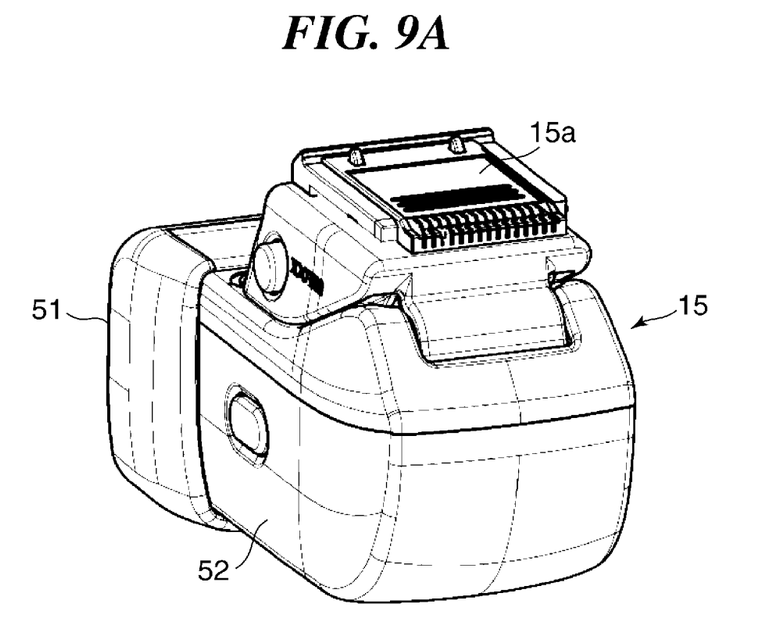
FIG. 9A is a perspective view of the electronic viewfinder, as viewed from the connection plug side.
Figure 9B:
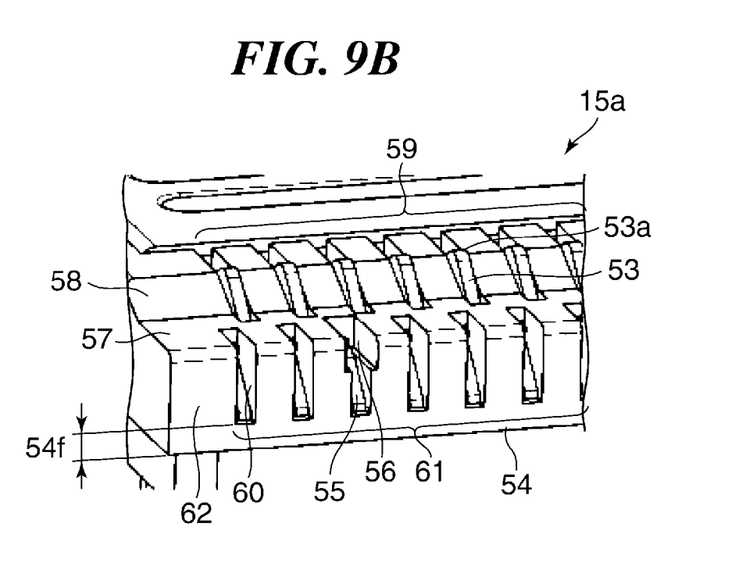
FIG. 9B is a partial enlarged view of terminals of the connection plug.

FIGS. 9A and 9B are views useful in explaining the connection plug 15a of the electronic viewfinder 15, in which FIG. 9A is a perspective view of the electronic viewfinder, as viewed from the connection plug side, and FIG. 9B is a partial enlarged view showing the terminals of the connection plug 15a.

Referring to FIG. 9A, the electronic viewfinder 15 includes an electronic viewfinder body 52, the connection plug 15a, and an eyepiece 51. The electronic viewfinder body 52 holds an optical unit, not shown, for adjusting diopter scale. A photographer can view a picked-up image displayed on the eyepiece 51.

Referring to FIG. 9B, the connection plug 15a has the base portion 54 holding the terminal rows. The base portion 54 is formed with an inclined surface 58, a flat portion 57, and the flat surface 62 opposed to the first contact surface 36 of the signal terminal connector 23. The inclined surface 58 is a surface opposed to the second contact surface 38 of the signal terminal connector 23. From the inclined surface 58, a terminal row 59 is exposed for connection to the second terminal row 38a of the signal terminal connector 23. The flat portion 57 is a surface opposed to the third surface 37 of the signal terminal connector 23. From the flat surface 62 opposed to the first contact surface 36 of the signal terminal connector 23, the terminal row 61 for connection to the first terminal row 36a of the signal terminal connector 23 is exposed.

Part of the flat surface 62 opposed to the first contact surface 36 of the signal terminal connector 23 forms the front-end protection portion 54f for the terminal row 61. The base portion 54 is formed with a recess 56 for accommodating the plug terminal 55 associated with the fitting key 40 (see FIG. 5A) provided on the third surface 37 (see FIG. 5A) of the signal terminal connector 23. The plug terminal 55 accommodated in the recess 56 is a detection signal terminal for connection to the terminal 36b of the first terminal row 36a of the signal terminal connector 23. The recess 56 associated with the fitting key 40 is different in dimension in a direction of the width from a recess 60 of each of the other terminals of the terminal row 61. With this arrangement, as mentioned above, even when connection plugs and signal terminal connectors having respective identical shapes are used, by changing the position of the fitting key, it is possible to easily define a proper combination of a signal terminal connector and a connection plug.

According to the present embodiment, the first contact surface 36 orthogonal to the attaching direction of the electronic viewfinder 15, and the second contact surface 38 which is inclined with respect to the first contact surface 36 by a predetermined angle are formed, and the connection terminals are provided in the first contact surface and the second contact surface, respectively. Further, the second contact surface 38 is formed such that it is displaced with respect to the first contact surface 36 in the Y direction, and is accommodated within the inner side wall spacing (20w) and the engagement portion height (20h) of the general-purpose accessory shoe, which are defined by the standards. This makes it possible to multipolarize the signal terminal connector 23 within the engagement portion of the accessory shoe 13 without increasing the size of the signal terminal connector 23 or reducing the pitch between the terminals of the signal terminal connector 23.

Further, according to the present embodiment, the fitting key 40 is provided on the flat surface 37 between the first contact surface 36 and the second contact surface 38. This makes it possible to provide the fitting key 40 within the engagement portion spacing 20p, the inner side wall spacing 20w, and the engagement portion height 20h, without affecting the pitch between the connection terminals.

Further, according to the present embodiment, with the above-described arrangement, it is possible to secure necessary length for each of an exposed length 36l of the contact surface of each terminal of the first terminal row 36a and the contact length 38l of the contact surface of each terminal of the second terminal row 38a, and hence connection between the signal terminal connector 23 and the connection plug 15a is made stable. Further, it is possible to sufficiently secure the contact length 38l of the contact surface of each terminal of the second terminal row 38a, and hence by forming one of the terminals of the second terminal row 38a as the GND terminal, it is possible to connect the GND terminal to the plug terminal 53 of the connection plug 15a prior to the other terminals. This makes it possible to reduce noise which is liable to be generated when the front-end portions 53a of the plug terminals 53 are brought into contact with the contact surfaces of the terminals of the second terminal row 38a.

Further, according to the present embodiment, each terminal of the first terminal row 36a of the signal terminal connector 23 is formed as a movable terminal having the front end which is displaced, and the elastic deformation portion of the movable terminal is arranged within the range of the height 23i lower than the ridgeline of the second contact surface 38. With this, the elastic deformation portion of each terminal of the first terminal row 36a is arranged lower than the connection plug 15a in the Y direction, and as a result, it is possible to multipolarize the terminals without increasing the size of the signal terminal connector 23.

Further, according to the present embodiment, the resin housing 23a of the signal terminal connector 23 is formed with the escape space 23k in the Z direction, for displacement of the contact portions 36n of the terminals of the first terminal row 36a. Each terminal of the second terminal row 38a is formed as a fixed terminal having the signal terminal contact surface which is not displaced, because a distance from the lead portion 38d to the contact portion 38n is short. As a result, it is possible to avoid increase in the size of the signal terminal connector 23.

Further, according to the present embodiment, the terminals of the terminal row 61 of the connection plug 15a which are brought into contact with the terminals of the first terminal row 36a of the signal terminal connector 23 are formed as the fixed terminals, whereby the provision of the escape space for the front end of each terminal is made unnecessary. This makes it possible to arrange the terminals without increasing the size in a state in which the signal terminal connector 23 and the connection plug 15a are engaged with each other. Therefore, the electronic viewfinder 15 that is multipolarized according to the demand for an increased number of pixels and a higher frame rate can be attached to the accessory shoe device which is in conformity with the general-purpose standards in the present embodiment.

Although in the present embodiment, the electronic viewfinder is taken as the multipolarized accessory by way of example, the multipolarized accessory may be a large-sized monitor or a microphone.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-018798 filed Feb. 3, 2016, and No. 2016-018797 filed Feb. 3, 2016, which are hereby incorporated by reference herein in their entirety.

What is claimed is:

1. A signal terminal connector for an accessory, comprising:
   a first surface opposed to an attaching direction of an accessory;
   a first terminal row provided in the first surface;
   a second surface that is inclined with respect to the first surface by a predetermined angle; and
   a second terminal row provided in the second surface,
   wherein the second surface is inclined with respect to the first surface, in a predetermined direction orthogonal to the attaching direction of the accessory and a direction in which terminals of the second terminal row are arranged, and is displaced with respect to the first surface in the predetermined direction, wherein terminals of the first terminal row and the terminals of the second terminal row are arranged in a staggered relation to each other, wherein each terminal of the first terminal row is a movable terminal having a contact portion which is displaced, and wherein each terminal of the second terminal row is a fixed terminal having a contact portion which is not displaced.

2. The signal terminal connector according to claim 1, wherein assuming that a side closer to the first surface in the inclination direction of the second surface is set as an upper side, the first surface is provided upward of the second surface, and also forward of the second surface in the attaching direction of the accessory.

3. The signal terminal connector according to claim 1, further comprising a third surface provided between the first surface and the second surface, and wherein the third surface is provided with a fitting member for defining a proper combination with a connection plug of the accessory.

4. The signal terminal connector according to claim 3, wherein one of terminals located in the vicinity of the fitting member, out of terminals of the first terminal row and the terminals of the second terminal row, is a detection signal terminal for detecting attachment of the connection plug of the accessory.

5. The signal terminal connector according to claim 1, wherein at least one of terminals provided in the second surface is a GND terminal which is connected to a connection plug of the accessory prior to the other terminals provided in the second surface.

6. The signal terminal connector according to claim 1, wherein terminals of the first terminal row and the terminals of the second terminal row are terminals connected, respectively, to a main circuit board of an apparatus on which an accessory shoe device to which the accessory is attached is mounted via a flexible circuit board.

7. The signal terminal connector according to claim 6, wherein a dimension of the signal terminal connector in a width direction intersecting the attaching direction of the accessory is larger than an engagement portion spacing of an engagement member of the accessory shoe device, with which the accessory is engaged.

8. The signal terminal connector according to claim 6, wherein the signal terminal connector is applied to the accessory shoe device, and is disposed forward of signal terminals for an external strobe, which are provided in the accessory shoe device, in the attaching direction of the accessory.

9. The signal terminal connector according to claim 1, wherein the accessory is an electronic viewfinder.

10. The signal terminal connector according to claim 1, wherein the terminals of the first terminal row are held by a holding member having an escape space.

11. The signal terminal connector according to claim 1, wherein each terminal of the first terminal row includes the contact portion and an elastic deformation portion having a U-shape, and the elastic deformation portion is narrower in width than a portion other than the elastic deformation portion, as viewed in a pitch direction of the terminals.

12. The signal terminal connector according to claim 11, wherein an intermediate portion between the elastic deformation portion and the contact portion is in contact with part of an inner wall surface forming an inner space of the holding member which holds the terminals of the second terminal row.

13. The signal terminal connector according to claim 1, wherein the terminals of the first terminal row and the terminals of the second terminal row are connected, respectively, to a main circuit board of an apparatus on which an accessory shoe device to which the accessory is attached is mounted via a flexible circuit board.

14. The signal terminal connector according to claim 13, wherein a dimension of the signal terminal connector in a width direction intersecting the attaching direction of the accessory is larger than an engagement portion spacing of an engagement member of the accessory shoe device, with which the accessory is engaged.

15. The signal terminal connector according to claim 13, wherein the signal terminal connector is applied to the accessory shoe device, and is disposed forward of signal terminals for an external strobe, which are provided in the accessory shoe device, in the attaching direction of the accessory.

16. The signal terminal connector according to claim 1, further comprising a fitting member provided in the vicinity of the first surface or the second surface, for defining a proper combination with the accessory.

17. The signal terminal connector according to claim 1, wherein the accessory is an electronic viewfinder.

18. An accessory shoe device including:
an engagement member to which an accessory is attached,
signal terminals for an external strobe that is attached to the engagement member, and
a signal terminal connector for an accessory,
wherein the signal terminal connector comprises:
a first surface opposed to an attaching direction of an accessory;
a first terminal row provided in the first surface;
a second surface that is inclined with respect to the first surface by a predetermined angle; and
a second terminal row provided in the second surface,
wherein the second surface is inclined with respect to the first surface, in a predetermined direction orthogonal to the attaching direction of the accessory and a direction in which terminals of the second terminal row are arranged, and is displaced with respect to the first surface in the predetermined direction,
wherein terminals of the first terminal row and the terminals of the second terminal row are arranged in a staggered relation to each other,
wherein each terminal of the first terminal row is a movable terminal having a contact portion which is displaced, and
wherein each terminal of the second terminal row is a fixed terminal having a contact portion which is not displaced.

19. An image pickup apparatus including an accessory shoe device,
wherein the accessory shoe device includes an engagement member to which an accessory is attached, signal terminals for an external strobe that is attached to the engagement member, and a signal terminal connector for an accessory,
wherein the signal terminal connector comprises:
a first surface opposed to an attaching direction of an accessory;
a first terminal row provided in the first surface;
a second surface that is inclined with respect to the first surface by a predetermined angle; and
a second terminal row provided in the second surface,
wherein the second surface is inclined with respect to the first surface, in a predetermined direction orthogonal to the attaching direction of the accessory and a direction in which terminals of the second terminal row are arranged, and is displaced with respect to the first surface in the predetermined direction, wherein terminals of the first terminal row and the terminals of the second terminal row are arranged in a staggered relation to each other, wherein each terminal of the first terminal row is a movable terminal having a contact portion which is displaced, and wherein each terminal of the second terminal row is a fixed terminal having a contact portion which is not displaced.

20. An accessory including a connection plug connected to a signal terminal connector for an accessory,
wherein the signal terminal connector comprises:
a first surface opposed to an attaching direction of an accessory;
a first terminal row provided in the first surface;
a second surface that is inclined with respect to the first surface by a predetermined angle; and
a second terminal row provided in the second surface,
wherein the second surface is inclined with respect to the first surface, in a predetermined direction orthogonal to the attaching direction of le accessory and a direction in which terminals of the second terminal row are arranged, and is displaced with respect to the first surface in the predetermined direction, and wherein the connection plug includes terminals for connection to terminals of the first terminal row of the signal terminal connector and terminals for connection to the terminals of the second terminal row of the signal terminal connector, wherein the terminals of the first terminal row and the terminals of the second terminal row are arranged in a staggered relation to each other, wherein each terminal of the first terminal is a movable terminal having a contact portion which is displaced, wherein each terminal of the second terminal row is a fixed terminal having a contact portion which is not displaced, wherein the terminals of the first terminal row of the connection plug are fixed terminals which are brought into contact with the terminals of the first terminal row of the signal terminal connector for the accessory, and wherein the terminals of the second terminal row of the connection plug are movable terminals which are brought into contact with the terminals of the second terminal row of the signal terminal connector, and are held by a base portion having an escape space.

* * * * *